(12) United States Patent
Guerin et al.

(10) Patent No.: US 9,816,462 B2
(45) Date of Patent: Nov. 14, 2017

(54) INTEGRATED THRUST REVERSER DEVICE AND AIRCRAFT ENGINE NACELLE EQUIPPED THEREWITH

(71) Applicant: AIRCELLE, Gonfreville l'Orcher (FR)

(72) Inventors: Philipe Guerin, Le Havre (FR); Olivier Kerbler, Antony (FR); Jean-Paul Rami, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 15/017,931

(22) Filed: Feb. 8, 2016

(65) Prior Publication Data

US 2016/0160798 A1    Jun. 9, 2016

Related U.S. Application Data

(63) Continuation of application No. PCT/FR2014/052010, filed on Aug. 1, 2014.

(30) Foreign Application Priority Data

Aug. 7, 2013  (FR) .................................... 13 57841

(51) Int. Cl.
*F02K 1/76* (2006.01)
*F02K 1/72* (2006.01)
(Continued)

(52) U.S. Cl.
CPC ............. *F02K 1/72* (2013.01); *F02K 1/09* (2013.01); *F02K 1/62* (2013.01); *F02K 1/625* (2013.01);
(Continued)

(58) Field of Classification Search
CPC ... F02K 1/76; F02K 1/70; F02K 1/766; F02K 1/763; F02K 1/62; F02K 1/625
See application file for complete search history.

(56) References Cited

U.S. PATENT DOCUMENTS

| | | | | |
|---|---|---|---|---|
| 5,255,510 A | * | 10/1993 | Lardellier | F02K 1/12 244/110 B |
| 5,778,659 A | * | 7/1998 | Duesler | F02K 1/09 239/265.27 |

(Continued)

FOREIGN PATENT DOCUMENTS

| | | |
|---|---|---|
| EP | 0779429 A2 | 6/1997 |
| EP | 1801007 A1 | 6/2007 |

(Continued)

OTHER PUBLICATIONS

International Search Report dated Sep. 12, 2014 in International Application No. PCT/FR2014/052010.

*Primary Examiner* — Pascal M Bui Pho
*Assistant Examiner* — Thuyhang Nguyen
(74) *Attorney, Agent, or Firm* — Burris Law, PLLC

(57) ABSTRACT

The present disclosure provides a thrust reverser device that is integrated in an aircraft nacelle. Blocking flaps are stored inside a mobile cowl disposed in a downstream section of the nacelle, under deflection cascade assemblies during direct-jet operation of the nacelle. Various devices are provided for executing the passage from direct-jet operation to reverse-jet operation in two stages: the mobile cowl moves in translation towards the downstream end of the nacelle; and each flap is then deployed in the main air flow path.

13 Claims, 5 Drawing Sheets

(51) Int. Cl.
  *F02K 1/62* (2006.01)
  *F02K 1/70* (2006.01)
  *F02K 1/09* (2006.01)
  *F02K 3/06* (2006.01)

(52) U.S. Cl.
  CPC .................. *F02K 1/70* (2013.01); *F02K 1/76* (2013.01); *F02K 1/763* (2013.01); *F02K 1/766* (2013.01); *F02K 3/06* (2013.01)

(56) References Cited

U.S. PATENT DOCUMENTS

| | | | |
|---|---|---|---|
| 2005/0001095 A1 | 1/2005 | Christensen | |
| 2012/0067975 A1* | 3/2012 | Vauchel | F02K 1/72 239/265.33 |
| 2012/0138707 A1* | 6/2012 | Vauchel | F02K 1/763 239/265.29 |

FOREIGN PATENT DOCUMENTS

| | | |
|---|---|---|
| EP | 1843031 | 10/2007 |
| FR | 2917788 | 6/2007 |
| FR | 2966883 | 11/2010 |
| FR | 2976625 | 6/2011 |
| WO | 2011/018569 A2 | 2/2011 |

\* cited by examiner

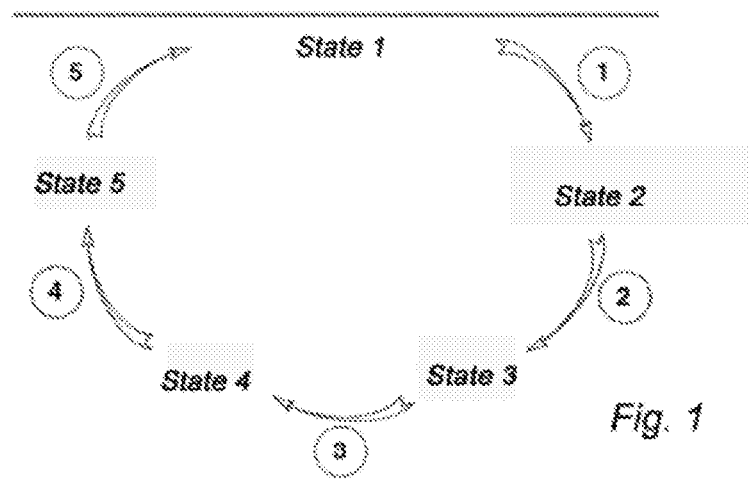
Fig. 1
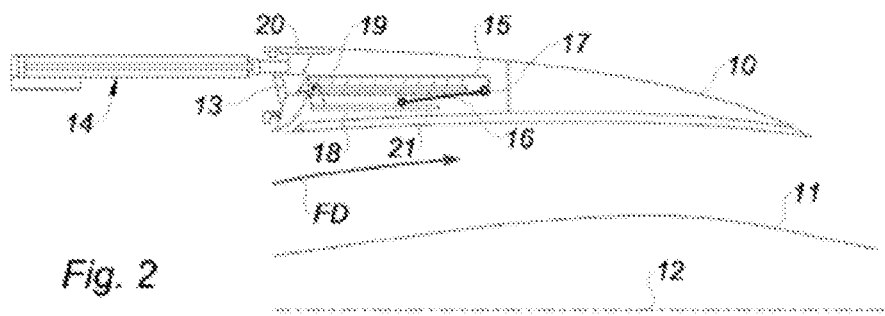
Fig. 2
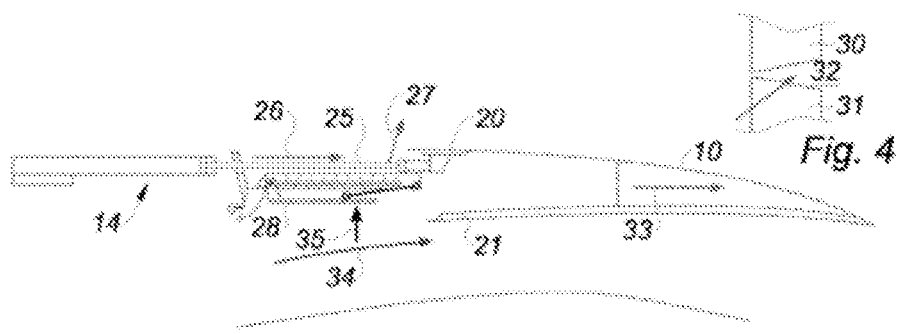
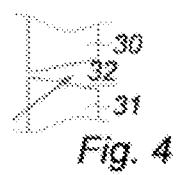
Fig. 4
Fig. 3

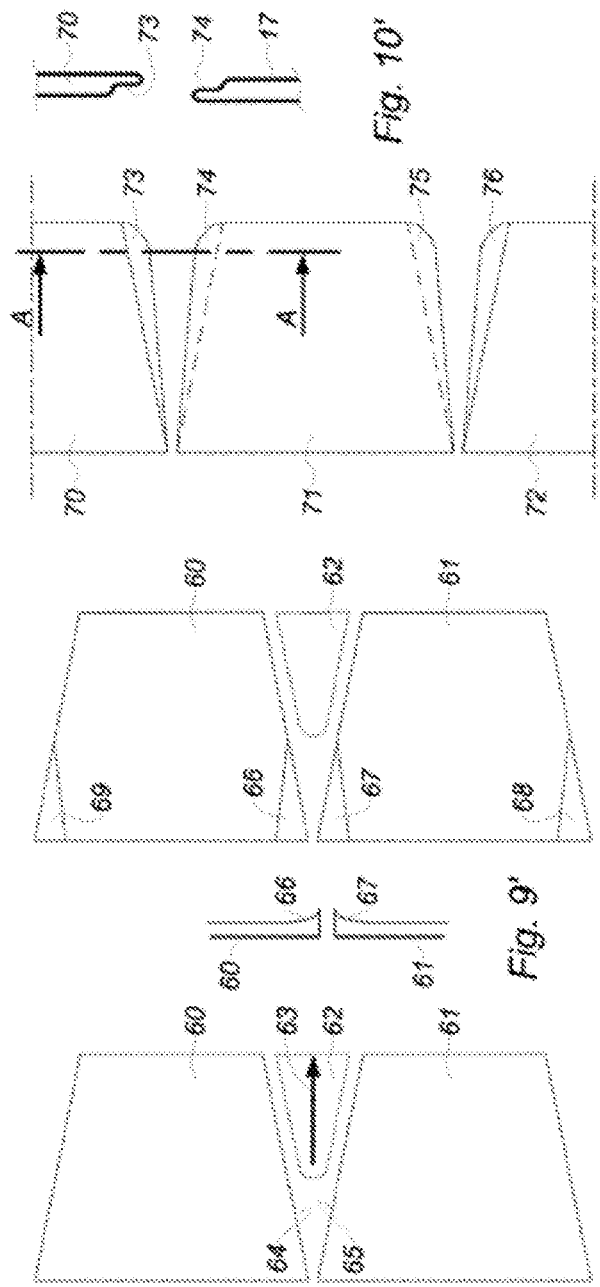

INTEGRATED THRUST REVERSER DEVICE AND AIRCRAFT ENGINE NACELLE EQUIPPED THEREWITH

CROSS-REFERENCE TO RELATED APPLICATIONS

This application is a continuation of International Application No. PCT/FR2014/052010, filed on Aug. 1, 2014, which claims the benefit of FR 13/57841, filed on Aug. 7, 2013. The disclosures of the above applications are incorporated herein by reference.

FIELD

The present disclosure concerns a thrust reverser device for an aircraft engine nacelle and an aircraft engine nacelle equipped with the same.

BACKGROUND

The statements in this section merely provide background information related to the present disclosure and may not constitute prior art.

Specifically, the concerned thrust reverser device is of the "cascade" type, that is to say, the thrust reverser comprises a cowl, for example of the "O-duct" type, alternately movable between a deployed position wherein it opens a passage within the nacelle and uncovers the cascade vanes of the secondary air flow, and a stowed position wherein it closes this passage. The reorientation of the secondary air flow passing through the annular flow path is ensured by means of the cascades and complementary blocking doors, also called flaps.

The application EP 1 843 031 is known from the state of the art, wherein the cascade vanes are in normal operation and stored in a volume defined inside the movable cowl. During translation of the latter, blocking flaps are then driven in the flow path of the air flow and, while blocking the air, return it through the cascade vanes to the front of the nacelle from outside. In particular, connecting rods disposed in the thrust reversal flow disturb the flowing, which implies a risk of degradation of the cascade vanes.

The patent application FR 2 966 883 owned by the applicant is known from the prior art and describes a thrust reverser device with flaps integrated in the movable cowl.

SUMMARY

The present disclosure relates to a thrust reverser device for an aircraft engine nacelle comprising:
- a cowl movable alternately between a deployed position wherein it opens a passage within the nacelle, said position being adapted to allow a reverse jet operation of said nacelle, and a stowed position wherein it closes this passage, said position being adapted to allow a direct jet operation of the nacelle;
- a set of cascade vanes of a secondary air flow flowing in a flow path of the secondary air flow of the nacelle, fixed upstream of said cowl;
- flaps for blocking the secondary air flow, alternately movable between:
  - a folded position wherein said flaps are stored, at least for a stowed position of said cowl inside said cowl and under said set of cascade vanes, and
  - a deployed position wherein they block at least partially the secondary air flow flowing in said flow path,
- means for executing the switching from a direct jet operation to a reverse jet operation, adapted to perform the switching from a direct jet operation to a reverse jet operation in two stages:
  - translation of the movable cowl downstream of the nacelle to a deployed position of said cowl, said flaps being in folded position,
  - opening of the blocking flaps from said folded position to said deployed position,
- wherein the blocking flap includes an upstream edge mounted on an articulation device secured to said set of cascade vanes and a downstream edge mounted on a lever articulated relative to said set of cascade vanes.

According to other features:
- the means for executing the switching from a direct jet operation to a reverse jet operation is performed in two stages include cylinders secured to an upstream section of the nacelle through a front frame of the nacelle in order to mobilize the movable cowl, a bearing secured to the movable cowl being fixed to the end of the movable pin of each of said movable cowl mobilization cylinders, the sets of cascade vanes being secured to the front frame;
- the thrust reverser device includes two cowl mobilization cylinders disposed on either side of the "12 o'clock" position and a cowl mobilization cylinder disposed substantially at the "6 o'clock" position;
- the means for executing the switching from a direct jet operation to a reverse jet operation performed in two stages include cylinders secured to sets of cascade vanes which have each a worm gear on which an articulation device secured to the upstream edge of a flap is constrained to move in order to handle the blocking flap between a closed position under the set of cascade vanes and an open position across the flow path of the secondary air flow so that the air flow of the fan is directed through the sets of cascade vanes;
- the thrust reverser device includes at least one lock between the front frame and the movable cowl, adapted to lock said front frame and said movable cowl during the maintenance operations, so that the assembly composed of the front frame, the sets of cascade vanes, the blocking flaps and their cylinders and the movable cowl, can be operated by means of at least one of the cylinders for handling the movable cowl in maintenance;
- the means for executing the switching from a direct jet operation to a reverse jet operation performed in two stages include movable cowl handling cylinders and blocking flaps mobilization cylinders integrated into a plurality of combined cylinders including an inner pin for driving the movable cowl and a threaded outer tube for causing an articulation of the upstream edge of a blocking flap;
- the combined cylinder includes a first drive shaft coupled to the inner pin by a movement conversion mechanism, and at least a second drive shaft coupled to the threaded outer tube by another movement conversion mechanism;
- the combined cylinder is secured to the front frame associated with the movable cowl;
- the movable cowl includes a flange disposed beyond the volume occupied by the cylinders, the sets of cascade vanes, the blocking flaps and their levers when the movable cowl is closed and in that the flange carries bearings on which are secured the ends of the combined cylinder movable pins in order to mobilize the movable cowl;

the blocking flaps having a trapezoidal shape, the reduction of the aeramatch is ensured by at least one of the following means:

the gaps between the lateral edges of the flaps are occupied by movable triangular inter-flaps which are gradually removed from, respectively reintroduced in, the gap between two flaps as the flap goes down within the flow path of the secondary air flow, respectively the return of the flap under the set of cascade vanes;

the gaps between the lateral edges of the flaps are occupied by triangular inter-flaps secured to the sets of cascades deviation, the lateral edges of the flaps having thickness spoilers for diverting the intercepted jets and/or the lateral edges of the adjacent flaps have determined thickness profiles to ensure the overlapping of the lateral edges of the flaps when they are deployed in the flow path of the secondary air flow.

In the present application, the term "aeramatch" means the ratio between the outlet section of the nozzle in direct jet and the outlet section of the nozzle in thrust reversal.

Finally, the present disclosure concerns an aircraft engine nacelle which includes a thrust reverser device according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 shows a state diagram of a thrust reverser sequence using the arrangements of the present disclosure;

FIG. 2 shows a schematic sectional half-view of the downstream section of a nacelle incorporating a thrust reverser device according to one form of the present disclosure in a first state;

FIG. 3 shows a schematic sectional half-view of the downstream section of FIG. 2 in a second state;

FIG. 4 is a partial view of flaps used in the thrust reverser device;

Figure 11:
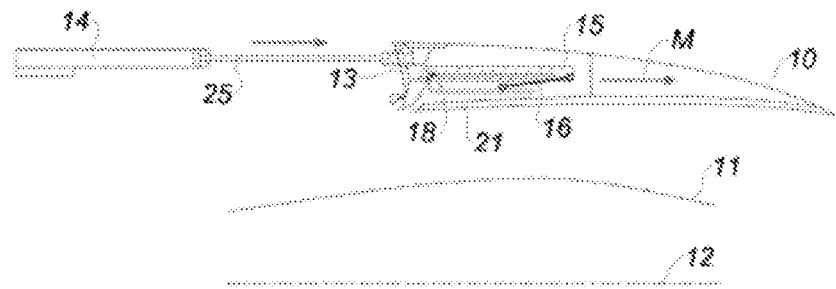
Figure 12:
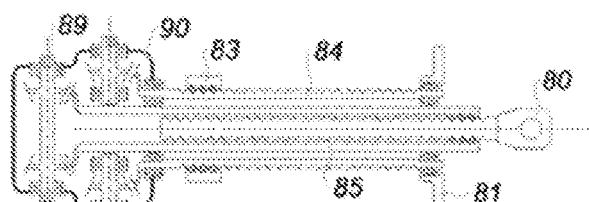
Figure 13:
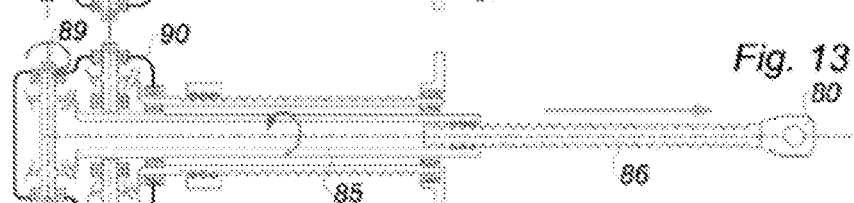
Figure 14:
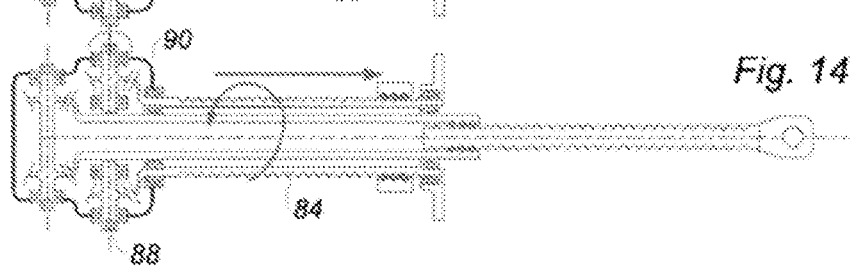
Figure 15:
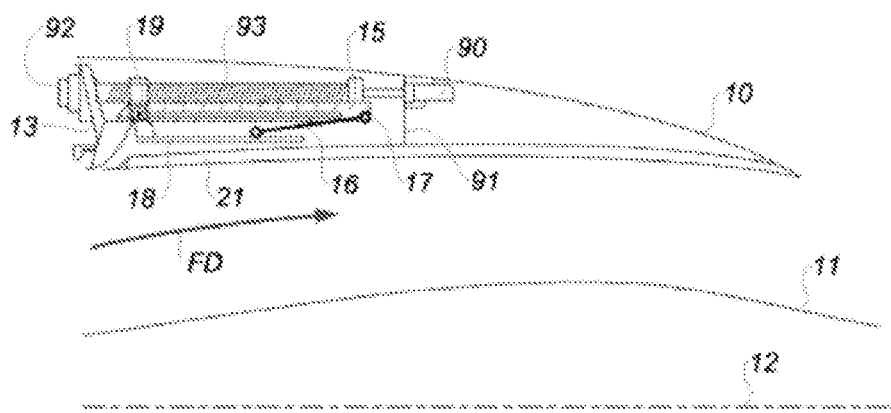
Figure 16:
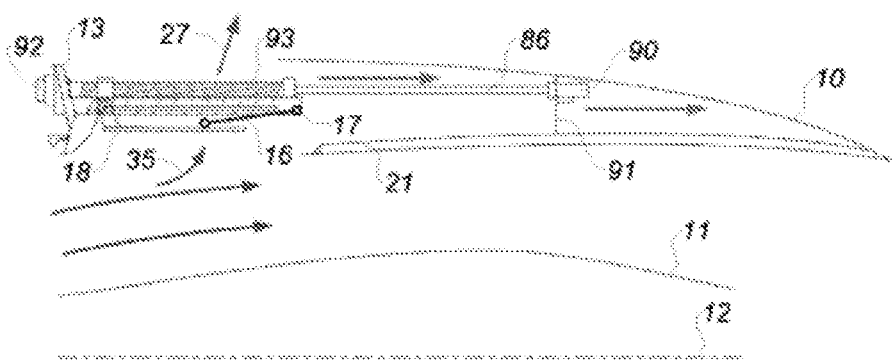

FIGS. 8, 9 and 9', 10 and 10' show various solutions to improve the aerodynamic behavior of the thrust reverser device in the third and fourth states;

FIG. 11 shows a schematic sectional half-view of the downstream section of FIG. 2 when it is configured during a maintenance operation;

FIGS. 12 to 14 show various states of a combined cylinder intended to be integrated in the thrust reverser device of a second form of the present disclosure;

FIG. 15 shows a schematic sectional half-view of the downstream section of a nacelle incorporating a thrust reverser device according to the second form of the present disclosure in a first state; and FIG. 16 shows a schematic sectional half-view of the downstream section of FIG. 15 in a second state.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a detailed operation sequence of a thrust reverser device according to the present disclosure. The thrust reverser device includes sets of cascade vanes, sets of secondary air flow blocking flaps and a movable cowl and various mobilization cylinders described later in the description.

The sets of cascade vanes are secured to the front frame, and the blocking flaps are associated with the sets of cascade vanes, on their inner face relative to the central axis of the nacelle. In a first state referenced as 'State 1' of the operation sequence, the sets of cascade vanes and the blocking flaps are inserted inside the thrust reverser movable cowl. The inactive configuration of the thrust reverser device produces a direct jet of the inlet section of the nacelle to the downstream or outlet section above the inner fixed structure of the nacelle at the aircraft engine. Through the activation of actuating means such as cylinders, the movable cowl is pushed downstream of the nacelle. At this stage, the secondary air flow does not escape yet through the cascade vanes.

The first change of state '1' leads to the state referenced as 'State 2' in which only the movable cowl opens. The sets of cascade vanes and the sets of jet blocking flaps are then uncovered. But the direct jet continues its path.

The second change of state '2' leads to the state referenced as 'State 3' wherein the sets of jet blocking flaps are then deployed. The change of state '2' is obtained through the activation of actuating means comprising a set of cylinders and connecting rods whose ends are articulated on three points (a translation point parallel to the cascades, an articulation point on the flaps and an articulation point on the rear of the frame). As a result, during deployment, the direct jet gradually intercepted by the jet blocking flaps ceases gradually to be converted into reverse jet which passes through the sets of cascade vanes so that, escaping through the openings distributed over the circumference released by the previous sliding of the movable cowl, and shaped by the profiles of the jet cascade vanes, the reverse jet is established outside the nacelle, by flowing into an annular jet around the inlet section of the nacelle and outside the latter.

The deployment state of the blocking flaps 'State 3' lasts as long as the thrust reversal is controlled.

When the cancellation of the thrust reversal is controlled, the third change of state '3' leads then to the state of closure of the jet blocking flaps which return to their initial position, obstructing the cascade vanes although the movable cowl remained in the open position, the direct jet begins to be established and the reverse jet ceases gradually. The state referenced as 'state 4' in which the jet blocking flaps being completely folded under the sets of cascade vanes is thus reached, the reverse jet is interrupted and the direct jet is resumed.

The fourth change of state '4' sees the beginning of the closure of the movable cowl masking then the openings above the cascade vanes to finally reach the state wherein the movable cowl has resumed the flight configuration and the direct jet is established.

We return then through the fifth change of state '5' to state 1 wherein, the thrust reverser device being closed, the nacelle is in flight position with the direct jet established above the fixed inner structure.

According to the present disclosure, the thrust reverser device includes means for executing the switching from a direct jet operation to a reverse jet operation performed in two stages. These means include in particular computers for controlling electric motors in order to drive movable cowl mobilization cylinders, then blocking flaps, only once the movable cowl has been moved downstream to open the radially outer face of the sets of cascade vanes. We follow the operation sequence in FIG. 1, from the state 'State1' to the state 'State 3'. The reverse sequence is then controlled to bring the blocking flaps out of the flow path of the secondary air flow, under the sets of cascade vanes, then the movable cowl for covering the cylinders, the sets of cascade vanes as well as the blocking flaps and their levers, so that said flow path is free of interferences with these components. We follow the operation sequence in FIG. 1, from the state 'State 3' to the state "State 1'.

FIG. 2 shows a schematic sectional half-view of the downstream section of a nacelle incorporating a thrust reverser device according to one form of the present disclosure in a first state corresponding to the state "State 1" of the diagram of FIG. 1.

There is shown the central axis 12 of the nacelle which is an axis of revolution along which the thrust of the aircraft engine is performed. There is schematically shown a portion of the fixed inner structure (IFS) 11 within which the engine itself is disposed and in 10 the movable cowl which constitutes the downstream section of the nacelle of the present disclosure. The movable cowl mainly includes a portion 10 which serves as outer skin to the nacelle and which ends upstream (on the left in the drawing) beyond the sets of cascade vanes as the set 15 of cascade vanes disposed in a position called twelve o'clock, "12 o'clock", position that is to say at the upper portion of the nacelle.

At least three movable cowl structures are known, namely the "0" annular cowl, and the "C" or "D" semi-cylindrical cowls which are adapted to the movable cowl of the nacelle of the present disclosure.

The end on the left of the outer skin 10 of the movable cowl is secured to a bearing 20 on which is fastened the end of the movable pin of at least one cylinder, herein disposed in the "12 o'clock" position, which carries the mark 14. The cylinder(s) such as the movable cowl 10 mobilization cylinder 14 is/are secured to the inlet section disposed upstream, (on the left in the drawing) and not shown, of the nacelle.

In one form, three mobilization cylinders such as the cylinder 14 are disposed in this manner. Two cylinders are disposed on either side of the "12 o'clock" position or upper portion of the nacelle, while the third and last cylinder, also similar to the cylinder 14, is disposed in a position called six o'clock, "6 o'clock", position, in the lower portion of the nacelle, not visible in FIG. 2.

The movable pins of the cylinders secure to bearings such as the bearing 20 inside the outer skin 10 of the movable cowl. The movable cowl has a determined profile on its outer skin 10 which is connected to the profile of the outer cowl of the upstream section not shown and ends on the right in the drawing on the ejection portion of the flow path of the secondary air flow and of the flow coming from the engine itself within the inner fixed structure IFS 11. It also includes an inner skin 21 which is connected downstream to the end of the outer skin 10 so that in the state shown in FIG. 2, the sets of cascade vanes such as the set of cascades vanes 15 and the sets of blocking flaps such as the set of blocking flaps 18, shown in FIG. 2, are within the volume arranged between the outer skin 10 and the inner skin 21. The inner skin 21 has a surface directed toward the inner fixed structure IFS 11 which limits the flow path of the secondary air flow FD before its ejection beyond the nacelle on the right in the drawing.

The aforementioned volume inside the inner and outer skins of the movable cowl 10 is also limited by an annular portion, surrounding the axis of revolution 12, and which is secured to the upstream section, in practice, secured to the fan cowl disposed upstream (on the left in the drawing) of the downstream section and from which comes the flow path of the secondary air flow FD. This annular portion referred to as front frame 13 is pierced with openings allowing the passage of the movable pins of the movable cowl 10 mobilization cylinders, such as the cylinder 14. It also serves as support to the sets of cascade vanes such as the set of cascade vanes 15 which are evenly disposed around the axis of revolution 12, within the volume arranged inside the movable cowl.

The cascade vanes 15 are components of a cascade-type thrust reverser device, in that they cooperate in reversing the path of the flow path FD coming from the fan installed inside the upstream section of the nacelle (not shown). According to one feature of the present disclosure, the cascades are mounted on supports which are secured to the front frame 13. Further, the cascade supports of each set of cascade vanes such as the set of cascade vanes 15 carry a set of flow path blocking flaps, such as the articulated flap 18 by an upstream edge with a first pivot or articulation device 19 and by a downstream edge with at least one lever such as the lever 16, itself articulated on the support of the set of cascade vanes 15. As a result, the articulated flap 18 is in the state shown in FIG. 2 folded under the set of cascade vanes 15 within the interior volume comprised in the movable cowl 10 above the inner skin 21 which stops upon contact with the downstream section of the nacelle to the right of the front frame 13.

FIG. 3 shows a schematic sectional half-view of the downstream section of FIG. 2 in a second state of operation of the thrust reverser device. The cylinders, such as the cylinder 14 have then pushed the movable cowl 10, 21 to the right 33 of the drawing (downstream of the nacelle). To this end, the movable pin 25 of the cylinder 14 is moved to the right 26 by pushing the movable cowl through its bearing 20.

However, the flap 18, as for all sets of blocking flaps associated with the sets of cascade vanes such as the set 15, remains in the closed position on the inner face of the set of cascade vanes 15 to which it is associated. As a result, although the upstream edges of the inner 21 and outer 10 skins of the movable cowl have cleared the orifices of the thrust reversal, the flow path of the secondary air flow FD is still mainly supplied by the fan (not shown).

However, because of the structure of the flaps and the aerodynamic effects introduced by the opening of the movable cowl 10, 21, a fraction of the air 35 coming from the flow path of the secondary air flow 34 (FD) is collected, passes through the flaps by the lateral edges between flaps such as the flap 18 and passes through 27 the sets of cascade vanes such as the set of cascades 15.

Indeed, in order to allow forming a barrier in annular diaphragm substantially across the flow path, the various blocking flaps such as the flap 18 have a trapezoid shape so that their edge on the upstream side of the nacelle when they are still closed on the sets of cascade vanes is longer than their edge on the downstream side, which will be subsequently directed towards the central axis 12 of the nacelle through the air path. This trapezoidal shape comes from the fact that, in the deployed position in the flow path of the secondary air flow, the circumference surrounded by the downstream edges of the flaps is smaller than the circumference surrounded by the upstream edges of the flaps remained farther from the central axis 12 of the nacelle.

Referring to FIG. 4, it is thus noted that the gap 32 between two successive blocking flaps 30 and 31, when closed over the set of cascade vanes to which they are associated, is triangular in shape. Therefore, this space 32 lets a portion of the flow path of the secondary air flow escape outwards 27.

Figure 5:
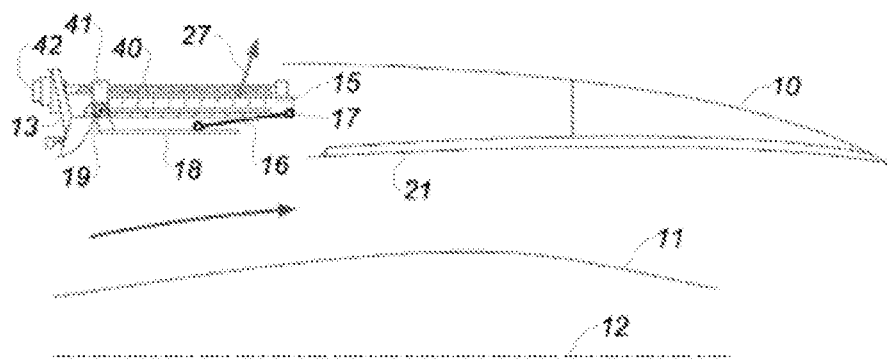
FIG. 5 shows a schematic sectional half-view of the downstream section of FIG. 2 in a third state.

FIG. 5 shows a schematic sectional half-view of the downstream section of FIG. 2 in a third state of the operation sequence described in FIG. 1.

The movable cowl 10 being open, a blocking flap cylinder 42 of the direct jet blocking flaps has been added to the representation of FIG. 4. The blocking flap cylinder 42 is secured to the front frame 13 and includes in one embodiment a worm gear 40, on which can move a nut 41, blocked in rotation. The nut 41 carries the articulation device 19 of the upstream edge of the flap 18 disposed closed under the set of cascade vanes 15. The articulation device 19 includes a shaft which penetrates in a slide 28 secured to the support of the set of cascade vanes 15 downstream of the nacelle. When the blocking flap cylinder 42 is rotated, the worm gear 40 begins to rotate thereby driving the nut 41. The upstream edge of the flap 18 will then be driven downstream compelled to stay along the slide 28, substantially parallel to the central axis 12 of the nacelle.

Figure 6:
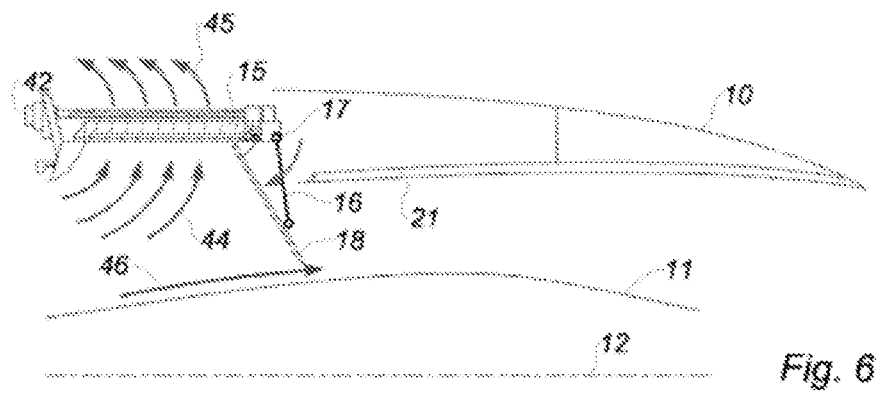
FIG. 6 shows a schematic sectional half-view of the downstream section of FIG. 2 in a fourth state.

FIG. 6 shows a schematic sectional half-view of the downstream section of FIG. 2 during the switching from the third state to the fourth state in the sequence described in FIG. 1.

The nut 41 has been fully driven to the right (downstream) of the figure so that the blocking flap 18 is pivoted and moved so as to intercept the flow path 46. The greatest part of the air flow coming from the downstream fan (not shown) is then diverted by the blocking flaps such as the flap 18, disposed in annular diaphragm around the axis of revolution of the nacelle 12 within a flow 44 which then passes, through their bottom directed towards the axis of revolution 12, through the sets of cascade vanes such as the set of cascades 15. This results in a flow emitted outside the opening provided by the sliding on the right of the movable cowl 10 of a reversed flow 45.

Figure 7:
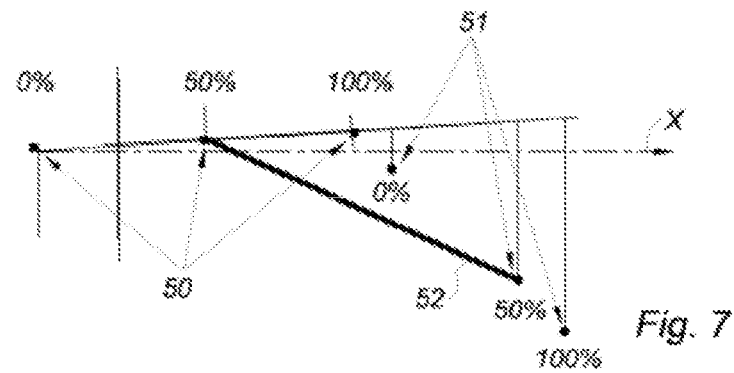
FIG. 7 shows a diagram of the stroke of a flap when switching from the third state to the fourth state.

FIG. 7 shows a diagram of the stroke of a flap when switching from the third state to the fourth state. In one form, the slide (28; FIG. 6) which serves to guide the upstream edge of each flap is inclined along the direction 50 relative to the direction X of the axis of revolution 5 (12, FIG. 6) of the nacelle by a negative angle between the X axis, parallel to the central axis 12 of the nacelle, and the axis of the slide 28, in that the upstream edge of the flap compelled to remain on the slide moves away from the central axis as it moves downstream of the nacelle. Because of the lever (16, FIG. 6), the blocking flap follows a stroke by passing through the position 52 until its downstream end reaches the "100%" opening position of the flap of blocking the flow path of the secondary air flow.

FIGS. 8, 9 and 9', 10 and 10' show various solutions to improve the aerodynamic behavior of the reverser device in the third and fourth states.

The arrangements of the figures mentioned above are intended to reduce the risk of increasing the aeramatch described in particular with FIG. 4. It is only indicated that two aerodynamic effects are to be controlled. The first one appears during movement of the movable cowl which uncovers the blocking flaps under the sets of cascade vanes. It has been described with FIG. 4 and leads to produce forces on the cascades by the air passages between flaps. The second aerodynamic effect occurs when the downstream edge of the flaps goes down in the main flow path that the flaps are intended to block in order to divert it through the sets of cascade vanes. In this second effect, the fan blades receive a turbulence produced by the gradual disruption of the flow path of the secondary air flow, when the triangular spaces between flaps are reduced as the flaps join. The following arrangements have been provided to reduce these adverse effects.

In the solution of FIG. 8, there is provided, for example in relation to the lever 17 of mobilization of the downstream edge of each blocking flap such as the flap 18 (FIG. 3), a movable triangular inter-flap disposed between two flaps 60 and 61. When the cylinder 42 (FIG. 3) begins to drive the flap 17 to its open position within the flow path of the secondary air flow, the inter-flap 62 follows a withdrawal movement 63 which allows it to release the space under the set of cascade vanes 15 to which the flap 18 is associated. In this way, the gaps between the lateral edges of the flaps are occupied by movable triangular inter-flaps which are gradually removed from, respectively reintroduced in, the gap between two flaps as the flap goes down within the flow path, respectively the return of the flap under the set of cascade vanes.

FIGS. 9 and 9' represents a solution in which the inter-flaps, such as the inter-flap 62 placed between the consecutive flaps 60 and 61, are fixed. To increase the pressure of passage of air in thrust reversal, spoilers 66-69 have been disposed on the upstream corners of the flaps 60 and 61 so that the amount of air captured in the interrupted path of the flow path by the blocking flaps in the open position is increased to counter-balance the obstruction presented by the fixed inter-flaps 62. FIG. 9' shows a partial section of the thickness of the upstream corners of the flaps. Each protrusion is composed of a gradual extra-thickness, which is at its maximum on the lateral edge of the flap. As a result, the gaps between the lateral edges of the flaps are occupied by triangular inter-flaps secured to the sets of cascade vanes, the lateral edges of the flaps having thickness spoilers for diverting the intercepted jets.

FIGS. 10 and 10' shows a solution which enables to overlap the lateral edges 73 and 74 of the adjacent flaps 70-72. To this end, when the flaps are open, the lateral edges, downstream of the flaps are gradually covered from upstream to downstream when the flaps go down gradually from the closed position to the open position when each blocking flap is disposed within the flow path. FIG. 10' is a schematic partial section along the line A-A of FIG. 10. The covering extreme line is calculated on each flap edge so that the flaps imbricate into each other when they are open. The lateral edges of the adjacent flaps thus have determined thickness profiles to provide the overlapping of the lateral edges of the flaps when they are deployed into the flow path.

This arrangement thus inhibits turbulence when the blocking flaps go down within the flow path of the secondary air flow.

FIG. 11 shows a sectional view of the thrust reverser device mounted in the downstream section of a nacelle during a maintenance operation.

When the aircraft is on the ground, it is known to access the inner fixed structure IFS 11 by opening the movable cowl 10, 21 in the direction M. To this end, in the present disclosure, locks (not shown) are disposed between the front flange (not shown) of the movable cowl 10 and the front frame 13 of the nacelle. In this form, the front frame is made movable relative to the upstream section of the nacelle. During maintenance operations, these locks from the front flange of the movable cowl 10 to the front frame 13 are activated. As a result, the movable cowl mobilization cylinders, such as the cylinders disposed around the "12 o'clock" position and the movable cowl mobilization cylinder 14' disposed at the "6 o'clock" position, allow then mobilizing the movable cowl 10 associated with its front frame 13 for conducting afterwards the maintenance operations in the movable cowl and/or on the inner fixed structure 11. In these operations, the sets of cascade vanes such as 15 and 15' as well as the blocking flaps stowed under the cascades such as the flaps 18 and 18', are then inserted into the annular volume comprised at the upstream inlet of the movable cowl between its outer skin 10 and its inner skin 21.

The movable set composed of the movable cowl 10, of its front frame 13 and of sets of cascade vanes 15 and blocking flaps 18 and 18', is then closed by a reverse handling of the moveable cowl mobilization cylinders 14 and 14' and it is separated by reopening the locks between the front flange of the movable cowl 10 and the front frame 13 of the nacelle, in order to resume a flight configuration.

FIGS. 12 to 13 show a cylinder model integrating the two aforementioned cylinders reserved either for the movement of the movable cowl or for the movement of the blocking flaps.

In FIG. 12, the combined cylinder is in the closed position, an inner pin 80 being retracted and a threaded nut 83 being itself disposed on the leftmost in the drawing. The free end of the inner pin 80 is secured to the movable cowl while the nut 83 carries a frame intended to be attached to one/the blocking flap(s). The casing of the cylinder 90 includes a first input shaft 89 which, by a suitable mechanism (not shown) transforms the rotational movement of a shaft 89 into a rotational movement of a tapped tube 85. The threading of the inner shaft 80 being engaged with the tapped tube 85, the inner pin 80 can move to the right or to the left according to the direction of rotation applied to the input shaft and according to the position of the inner pin 80 in the tapped tube 85.

FIG. 13 shows the inner pin 80 fully extended from the cylinder body, which corresponds to the complete opening of the movable cowl to which the cylinder is attached.

FIG. 14 shows, the inner pin 80 being extended, the mobilization to the right of the nut 83 (FIG. 12) obtained by rotating the half-shafts such as the half-shaft 88 which are connected by a suitable mechanism (not shown) which transforms the rotational movement of the half shafts such as 88 into a rotational movement of a threaded outer pin to the cylinder, which serves as a worm gear to the nut 83 which is then translated to the right in order to cause the associated blocking flap(s) to go down.

FIG. 15 shows the application of the combined cylinder of FIGS. 12 to 14 to a thrust reverser device according to the present disclosure. The form of the thrust reverser device follows the sequence described with FIG. 1 and uses the same means for executing the switching from a direct jet operation to a reverse jet operation performed in two stages.

The movable cowl of this form is modified relative to the movable cowl of the embodiment of FIGS. 1 to 11. The movable cowl of the embodiment of FIG. 15 includes a flange 91 which separates the compartment intended to accommodate the sets of cascade vanes and the blocking flaps when it is folded, from the downstream portion of the movable cowl. The flange 91 joins the outer skin 10 to the inner skin 21, contributing to their rigidity. It also carries a bearing 90 on which is secured the end of the inner pin of each cylinder combined as the pin 80 of the combined cylinder of FIGS. 12 to 14.

The flange 91 is annular in shape about the central axis 12 of the nacelle and several combined cylinders are disposed at determined angular positions each with its own bearing on the flange 91. Thus, there is shown the combined cylinder 92, which has been secured to the front frame 13 and which is disposed in FIG. 15 over the set of cascade vanes 15 with the blocking flap 18 articulated by its upstream edge on the nut (such as the nut 83; FIG. 12) on which is articulated the upstream edge of the blocking flap 18 already described in FIGS. 2 to 10.

FIG. 15 shows the threaded outer tube 93 (identical to the tube 84; FIG. 12) of the combined cylinder 92 along which can move the nut which carries the articulation device 19 of the flap 18. The other elements have already been described.

FIG. 16 shows the movable cowl 10, 21 in its open position to the right, the inner pin 86 of the combined cylinder 92 having been fully extended from the body of the cylinder 92. It is the second state (see FIG. 1) of the thrust reverser device just prior to the operation of the blocking flaps 18. The other elements of the Figure have already been described and will not be described further.

Subsequently, the nut carrying the articulation device 19 of the upstream edge of the flap follows the same translation path along the tube 93 of the combined cylinder 92 secured to the front frame. The blocking flap 18 takes then the downward movement already described with FIG. 3 and the following figures. The same arrangements as those indicated in FIGS. 4 and 8, 9 and 9', 10' and 10' are also taken to improve the aeramatch.

In addition to the already described advantages, the present disclosure has the following advantages.

Because of the arrangement of the cylinders, the sets of cascades and flaps within the volume of the movable cowl, the flow path of the secondary air flow coming from the fan is remained without obstacle, causing improved aerodynamics in flight, as well as improved acoustic behavior during takeoff and during flight.

When the mobilization cylinders of the flaps are separated, there is observed a reduction of the required driving power and its distribution about the central axis of the nacelle.

The dissociation of the movable cowl and of the front frame simplifies maintenance of the movable cowl.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser device for an aircraft engine nacelle comprising:
 a cowl alternately movable between a deployed position wherein the cowl opens a passage within the nacelle, said deployed position being adapted to allow a reverse jet operation of said nacelle, and a stowed position wherein the cowl closes the passage, said stowed position being adapted to allow a direct jet operation of the nacelle;

a set of cascade vanes of a secondary air flow flowing in a flow path of the nacelle, said set of cascade vane fixed upstream of said cowl;

flaps for blocking the secondary air flow, alternately movable between:
- a folded position wherein the flaps are stored, at least for a stowed position of said cowl, within said cowl and under said set of cascade vanes, and
- an open position wherein the flaps block at least partially the secondary air flow flowing in said flow path, a controller for executing switching from the direct jet operation to the reverse jet operation, the operation comprising two stages:
1. translation of the cowl downstream of the nacelle to the deployed position of said cowl, said flaps being in the folded position; and
2. opening of the flaps from said folded position to said open position, wherein the flaps include an upstream edge mounted on a slide secured to said set of cascade vanes and a downstream edge mounted on a lever articulated relative to said set of cascade vanes, wherein the upstream edge of the flaps is driven downstream by the slide in the deployed position.

2. The thrust reverse device according to claim 1, wherein the flaps have a trapezoidal shape, and a reduction of an aeramatch is achieved by at least one of:
- gaps between lateral edges of the flaps are occupied by movable triangular inter-flaps, wherein the gaps are gradually removed when the flaps go down within a direct air flow path, and reintroduced when the flaps return under the set of cascade vanes:
- the gaps between the lateral edges of the flaps are occupied by triangular inter-flaps secured to the set of cascade vanes, the lateral edges of the flaps having spoilers in thickness for diverting intercepted jets; and
- the lateral edges of adjacent flaps have determined thickness profiles to provide overlapping of the lateral edges of the flaps when the flaps are deployed in the direct air flow path.

3. An aircraft engine nacelle including a thrust reverser device according to claim 1.

4. The thrust reverser device according to claim 1, wherein the flaps remain in the folded position until the cowl has moved to the deployed position.

5. The thrust reverser device according to claim 1, wherein the flaps are not pivoted when the cowl is moved from the stowed position to the deployed position.

6. The thrust reverser device according claim 1, wherein the controller for executing the switching from the direct jet operation to the reverse jet operation performed in two stages include cowl mobilization cylinders secured to an upstream section of the nacelle through a front frame of the nacelle in order to mobilize the cowl, a bearing secured to the cowl and being fixed to an end of a movable pin of each of said cowl mobilization cylinders, the set of cascade vanes being secured to the front frame, the front frame of the nacelle being disposed at a downstream end of the nacelle.

7. The thrust reverser device according to claim 6, further comprising two cowl mobilization cylinders disposed on either side of a 12 o'clock position and a cowl mobilization cylinder disposed substantially at a 6 o'clock position.

8. The thrust reverser device according to claim 1, wherein the controller for executing the switching from the direct jet operation to the reverse jet operation performed in two stages includes blocking flap cylinders secured to the set of cascade vanes, each having a worm gear on which an articulation device is secured to an upstream edge of a flap and being constrained to move in order to handle the flap between a folded position under the set of cascade vanes and the open position through a direct air flow path so that air flow from the direct air flow path is directed through the set of cascade vanes.

9. The thrust reverser device according to claim 8, wherein the front frame of the nacelle and the cowl are configured to be locked during maintenance operations, so that the front frame, the set of cascade vanes, the flaps, the blocking flap cylinders, and the cowl are operated as an assembly by means of at least one cowl mobilization cylinder for handling the cowl in maintenance.

10. The thrust reverser device according to claim 1, wherein the controller for executing the switching from the direct jet operation to the reverse jet operation carried out in two stages includes cowl mobilization cylinders and blocking flap mobilization cylinders integrated into a plurality of combined cylinders including an inner pin for driving the cowl and a threaded outer tube for causing movement of a nut secured to the upstream edge of a flap.

11. The thrust reverser device according to the claim 10, wherein the plurality of combined cylinder includes a first drive shaft coupled to the inner pin by a movement conversion mechanism, and at least a second drive shaft coupled to the threaded outer tube by another conversion mechanism.

12. The thrust reverser device according to claim 11, wherein the cowl includes a flange disposed beyond a volume occupied by the plurality of combined cylinders, the set of cascade vanes, the flaps and levers of the flaps when the cowl is closed and in that the flange carries bearings on which are secured ends of movable pins of the plurality of combined cylinders in order to mobilize the cowl.

13. The thrust reverser device according to claim 10, wherein the plurality of combined cylinders are secured to a front flange of the cowl.

* * * * *